(12) United States Patent
Kim

(10) Patent No.: US 10,618,407 B2
(45) Date of Patent: Apr. 14, 2020

(54) TERMINAL APPARATUS, VEHICLE, AND METHOD OF CONTROLLING THE TERMINAL APPARATUS

(71) Applicants: Hyundai Motor Company, Seoul (KR); Kia Motors Corporation, Seoul (KR)

(72) Inventor: Jeong Hun Kim, Seongnam-si (KR)

(73) Assignees: Hyundai Motor Company, Seoul (KR); Kia Motors, Corporation, Seoul (KR)

( * ) Notice: Subject to any disclaimer, the term of this patent is extended or adjusted under 35 U.S.C. 154(b) by 0 days.

(21) Appl. No.: 16/179,737

(22) Filed: Nov. 2, 2018

(65) Prior Publication Data

US 2019/0184825 A1    Jun. 20, 2019

(30) Foreign Application Priority Data

Dec. 15, 2017 (KR) .......................... 10-2017-0172753

(51) Int. Cl.
| | | |
|---|---|---|
| *B60K 35/00* | (2006.01) | |
| *B60K 37/02* | (2006.01) | |
| *G06F 3/0488* | (2013.01) | |
| *B60K 37/06* | (2006.01) | |

(52) U.S. Cl.
CPC .............. *B60K 35/00* (2013.01); *B60K 37/02* (2013.01); *B60K 37/06* (2013.01); *G06F 3/04886* (2013.01); *B60K 2370/11* (2019.05); *B60K 2370/1438* (2019.05);
(Continued)

(58) Field of Classification Search
CPC ...... G01C 21/00; G01C 21/34; G01C 21/367; G01C 21/3614; B60K 35/00; B60K 35/02; B60K 37/06; B60K 2370/11; B60K 2370/52; B60K 2370/152; B60K 2370/1438; B60K 2370/1472; G06F 3/04886; G06F 3/051; G06F 2203/04803
See application file for complete search history.

(56) References Cited

U.S. PATENT DOCUMENTS

| | | | | |
|---|---|---|---|---|
| 8,275,543 | B2 * | 9/2012 | Sim ..................... | G01C 21/3664 340/995.19 |
| 8,938,359 | B1 * | 1/2015 | Dorfmann .............. | G01C 21/00 340/945 |
| 10,108,332 | B2 * | 10/2018 | Park ...................... | G06F 3/0488 |

(Continued)

FOREIGN PATENT DOCUMENTS

KR    10-2016-0032451 A    3/2016

*Primary Examiner* — Sardis F Azongha
(74) *Attorney, Agent, or Firm* — Morgan, Lewis & Bockius LLP

(57) ABSTRACT

A terminal apparatus may include a display configured to display a driving route of a vehicle; a touch panel provided on the display and configured to detect a touch input; and a controller configured to, when a first tap input to the touch panel is detected and then at least one second tap input within a predetermined time is detected while the first tap is maintained, recognize a tap-tap interaction on the basis of input directions of the first tap and the at least one second tap, enlarge a driving route screen of the vehicle, which is displayed on the display, in a predetermined direction on the basis of the recognized tap-tap interaction, and display a driving route of the vehicle which is not visible before the enlargement of the screen.

26 Claims, 16 Drawing Sheets

(52) U.S. Cl.
CPC ............... *B60K 2370/1472* (2019.05); *B60K 2370/152* (2019.05); *B60K 2370/52* (2019.05)

(56) References Cited

U.S. PATENT DOCUMENTS

| | | | |
|---|---|---|---|
| 2011/0224896 A1* | 9/2011 | Napieraj | G01C 21/3614 701/532 |
| 2012/0007854 A1* | 1/2012 | Cho | G06F 3/04883 345/419 |
| 2014/0104197 A1* | 4/2014 | Khosravy | G01C 21/3664 345/173 |
| 2014/0191986 A1* | 7/2014 | Kim | G06F 3/0488 345/173 |
| 2015/0158388 A1* | 6/2015 | Kalbus | B60K 35/00 701/36 |
| 2016/0139798 A1* | 5/2016 | Takikawa | G06F 3/0482 345/173 |
| 2017/0048686 A1* | 2/2017 | Chang | H04W 4/14 |
| 2018/0224298 A1* | 8/2018 | Jeong | G01C 21/3614 |

* cited by examiner

TERMINAL APPARATUS, VEHICLE, AND METHOD OF CONTROLLING THE TERMINAL APPARATUS

CROSS-REFERENCE TO RELATED APPLICATION

The present application claims priority to Korean Patent Application No. 10-2017-0172753, filed on Dec. 15, 2017 in the Korean Intellectual Property Office, the entire contents of which is incorporated herein for all purposes by this reference.

BACKGROUND OF THE INVENTION

Field of the Invention

The present invention relates to a terminal apparatus, a vehicle, and a method of controlling the terminal apparatus, and more particularly, to a technique in which a touch interaction input by a driver is detected and a driving route screen displayed on a screen is enlarged.

Description of Related Art

Vehicles refer to apparatuses that can carry persons or things to destinations while travelling on roads or tracks. The vehicle may move to various positions mainly using one or more wheels disposed on a body thereof. Such vehicles may include three-wheeled vehicles, four-wheeled vehicles, two-wheeled vehicles such as motorcycles and the like, construction equipment, bicycles, trains running on rails placed on tracks, and the like.

Furthermore, terminal apparatuses perform a navigation function, a telephone function, an audio function, a radio function, a broadcast function, a text message service function, an Internet function, and the like. Lately, vehicles have more multiple and complex functions, and terminal apparatuses have various types of software to perform the multiple and complex functions.

Touch interactions are being applied to vehicle terminal apparatuses other than mobile devices such as audio video navigation (AVN) systems in vehicles. As the hardware performance of the vehicle terminal apparatuses is improved and the vehicle terminal apparatuses provide more functions than conventional vehicle terminal apparatuses, a new input method is required to more easily and intuitively operate the functions.

Furthermore, research has been conducted on a method of providing information needed by a driver by adjusting the content or size of a screen displayed on a terminal apparatus on the basis of a touch interaction.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing information needed by a driver by detecting a touch interaction input by the driver and enlarging a driving route screen displayed on a screen.

Additional aspects of the disclosure will be set forth in part in the description which follows and, in part, will be obvious from the description, or may be learned by practice of the disclosure.

In accordance with one aspect of the present invention, a terminal apparatus may include a display configured to display a driving route of a vehicle, a touch panel provided on the display and configured to detect a touch input, and a controller configured to, when a first tap input to the touch panel is detected and then at least one second tap input within a predetermined time is detected while the first tap is maintained, recognize a tap-tap interaction on the basis of input directions of the first tap and the at least one second tap, enlarge a driving route screen of the vehicle, which is displayed on the display, in a predetermined direction on the basis of the recognized tap-tap interaction, and display a driving route of the vehicle which is not visible before the enlargement of the screen.

The controller may convert a point at which a touch is input to the touch panel into coordinate data and recognize the tap-tap interaction on the basis of the converted coordinate data.

The controller may be configured to determine the input directions on the basis of coordinate data of a point at which the first tap is input and coordinate data of a point at which the at least one second tap is input.

When an input of the at least one second tap is, while an input of the first tap is maintained, detected at one point in a first direction from the point at which the first tap is input, the controller may recognize the tap-tap interaction as a first tap-tap interaction.

When an input of the at least one second tap is, while an input of the first tap is maintained, detected at one point in a second direction from the point at which the first tap is input, the controller may recognize the tap-tap interaction as a second tap-tap interaction.

When an input of the at least one second tap is, while an input of the first tap is maintained, detected at one point in a third direction from the point at which the first tap is input, the controller may recognize the tap-tap interaction as a third tap-tap interaction.

When an input of the at least one second tap is, while an input of the first tap is maintained, detected at one point in a fourth direction from the point at which the first tap is input, the controller may recognize the tap-tap interaction as a fourth tap-tap interaction.

When the controller recognizes the first tap-tap interaction, the controller may enlarge the driving route screen of the vehicle, which is displayed on the display, in the first direction thereof.

When the controller recognizes the second tap-tap interaction, the controller may enlarge the driving route screen of the vehicle, which is displayed on the display, in the second direction thereof.

When the controller recognizes the third tap-tap interaction, the controller may enlarge the driving route screen of the vehicle, which is displayed on the display, in the third direction thereof.

When the controller recognizes the fourth tap-tap interaction, the controller may enlarge the driving route screen of the vehicle, which is displayed on the display, in the fourth direction thereof.

When the tap-tap interaction is recognized, the controller may enlarge the driving route screen of the vehicle in the predetermined direction while maintaining a scale of the driving route, which is displayed on the display, and may display a driving route of the vehicle which is not visible before the enlargement of the screen.

When the tap-tap interaction is recognized, the controller may enlarge the driving route screen of the vehicle in the predetermined direction while maintaining a current position of the vehicle, which is displayed on the display, and may display a driving route of the vehicle which is not visible before the enlargement of the screen.

The controller may be configured to: determine whether a driving route of the vehicle exists on the driving route screen which is to be enlarged in the determined input direction thereof, and exclude enlarging the driving route screen of the vehicle in the determined input direction when a driving route of the vehicle does not exist on the driving route screen to be enlarged in the determined input direction thereof.

The controller may be configured to: obtain at least one piece of traffic information and road information on the driving route of the vehicle; and when the obtained at least one piece of traffic information and road information corresponds to a predetermined driving route screen enlargement condition, enlarge the driving route screen of the vehicle in the predetermined direction thereof, and display a driving route of the vehicle which is not visible before the enlargement of the screen.

The controller may be configured to: display an interface related to the enlargement of the driving route screen on the display when the obtained at least one piece of traffic information and road information corresponds to the predetermined driving route screen enlargement condition, wherein the interface may include an arrow indicating a direction in which the driving route screen is enlarged and an icon allowing the tap-tap interface to be input such that the driving route screen is enlarged.

In accordance with another aspect of the present invention, a method of controlling a terminal apparatus may include displaying a driving route of a vehicle on a display, detecting a first tap input to a touch panel, detecting at least one second tap input within a predetermined time while the first tap is maintained, recognizing a tap-tap interaction on the basis of input directions of the first tap and the at least one second tap, and enlarging a driving route screen of the vehicle, which is displayed on the display, in a predetermined direction on the basis of the recognized tap-tap interaction and displaying a driving route of the vehicle which is not visible before the enlarging of the screen.

The recognizing of the tap-tap interaction may include converting a point at which a touch is input to the touch panel into coordinate data and recognizing the tap-tap interaction on the basis of the converted coordinate data.

The determining of the input direction of the second tap may include determining the input directions on the basis of coordinate data of a point at which the first tap is input and coordinate data of a point at which the at least one second tap is input.

The recognizing of the tap-tap interaction may include recognizing the tap-tap interaction as a first tap-tap interaction when an input of the at least one second tap is, while an input of the first tap is maintained, detected at one point in a first direction from the point at which the first tap is input.

The recognizing of the tap-tap interaction may include recognizing the tap-tap interaction as a second tap-tap interaction when an input of the at least one second tap is, while the input of the first tap is maintained, detected at one point in a second direction from the point at which the first tap is input.

The recognizing of the tap-tap interaction may include recognizing the tap-tap interaction as a third tap-tap interaction when an input of the at least one second tap is, while the input of the first tap is maintained, detected at one point in a third direction from the point at which the first tap is input.

The recognizing of the tap-tap interaction may include recognizing the tap-tap interaction as a fourth tap-tap interaction when an input of the at least one second tap is, while the input of the first tap is maintained, detected at one point in a fourth direction from the point at which the first tap is input.

The enlarging of the driving route screen of the vehicle in the predetermined direction may include enlarging the driving route screen of the vehicle, which is displayed on the display, in the first direction when the first tap-tap interaction is recognized.

The enlarging of the driving route screen of the vehicle in the predetermined direction may include enlarging the driving route screen of the vehicle, which is displayed on the display, in the second direction when the second tap-tap interaction is recognized.

The enlarging of the driving route screen of the vehicle in the predetermined direction may include enlarging the driving route screen of the vehicle, which is displayed on the display, in the third direction when the third tap-tap interaction is recognized.

The enlarging of the driving route screen of the vehicle in the predetermined direction may include enlarging the driving route screen of the vehicle, which is displayed on the display, in the fourth direction when the fourth tap-tap interaction is recognized.

The enlarging of the driving route screen of the vehicle may include: enlarging the driving route screen of the vehicle in the predetermined direction while maintaining a scale of the driving route, which is displayed on the display, when the tap-tap interaction is recognized; and displaying a driving route of the vehicle which is not visible before the enlargement of the screen.

The enlarging of the driving route screen of the vehicle may include: enlarging the driving route screen of the vehicle in the predetermined direction while maintaining a current position of the vehicle, which is displayed on the display; and displaying a driving route of the vehicle which is not visible before the enlargement of the screen.

The method may further include: determining whether a driving route of the vehicle exists on the driving route screen which is to be enlarged in the determined input direction thereof; and excluding enlarging the driving route screen of the vehicle in the determined input direction when a driving route of the vehicle does not exist on the driving route screen to be enlarged in the determined input direction thereof.

The method may further include: obtaining at least one piece of traffic information and road information on the driving route of the vehicle; and when the obtained at least one piece of traffic information and road information corresponds to a predetermined driving route screen enlargement condition, enlarging the driving route screen of the vehicle in the predetermined direction thereof, and displaying a driving route of the vehicle which is not visible before the enlargement of the screen.

The method may further include: displaying an interface related to the enlargement of the driving route screen on the display when the obtained at least one piece of traffic information and road information corresponds to the predetermined driving route screen enlargement condition, wherein the interface may include an arrow indicating a direction in which the driving route screen is enlarged and an icon allowing the tap-tap interface to be input such that the driving route screen is enlarged.

In accordance with yet another aspect of the present invention, a vehicle may include a terminal apparatus configured to display a driving route of a vehicle, a touch input device configured to detect a touch input, and a controller configured to, when a first tap input to the touch input device is detected and then at least one second tap input within a predetermined time is detected while the first tap is maintained, recognize a tap-tap interaction on the basis of input directions of the first tap and the at least one second tap, enlarge a driving route screen of the vehicle, which is displayed on the terminal apparatus, in a predetermined direction on the basis of the recognized tap-tap interaction, and display a driving route of the vehicle which is not visible before the enlargement of the screen.

In accordance with yet another aspect of the present invention, a terminal apparatus may include a display configured to display a driving route of a vehicle, a touch panel provided on the display and configured to detect a touch input, and a controller configured to, when a first tap input to the touch input device is detected and then at least one second tap input within a predetermined time is detected while the first tap is maintained and at least one third tap which is input within a predetermined time is detected while the first tap and the at least one second tap are maintained, recognize a tap-tap interaction on the basis of input directions of the first tap and the at least one second tap and input directions of the at least one second tap and the at least one third tap, enlarge a driving route screen of the vehicle, which is displayed on the display, in a predetermined direction on the basis of the recognized tap-tap interaction, and display a driving route of the vehicle which is not visible before the enlargement of the screen.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
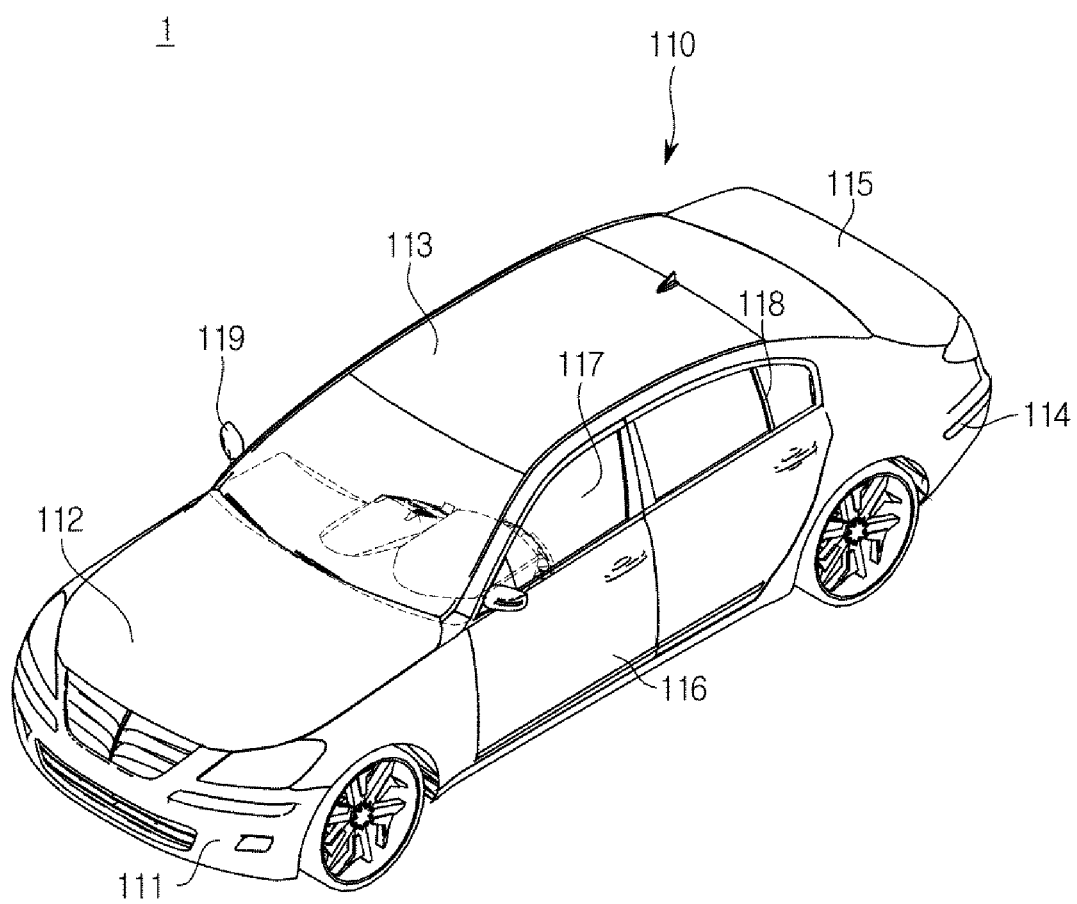
FIG. 1 is a diagram of an example of a vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Like reference numerals refer to like elements throughout the specification. The specification does not describe all elements of embodiments, and general contents or duplicative contents between the exemplary embodiments of the present invention in the art will be omitted. As used herein, the term "device," "module," "member," or "block" may be embodied in software or hardware. In various exemplary embodiments, a plurality of devices, modules, members, or blocks may be embodied as one element, or a single device, module, member, or block may include a plurality of elements.

Throughout the specification, when a portion is referred to as being "connected" to another portion, it includes "directly connected" and "indirectly connected." The indirect connection includes connection through a wireless communication network.

When a portion "includes" an element, another element may be further included, rather than excluding the existence of the other element, unless otherwise described.

It will be understood that, although the terms "first," "second," etc. may be used to distinguish one element from another, these elements may not be limited by the above-described terms.

As used herein, the singular forms "a," "an," and "the" are intended to also include the plural forms, unless the context clearly indicates otherwise.

In each step, identification codes are used for convenience of explanation and do not describe the order of the steps, and each step may be performed differently from the stated order unless explicitly stated in the context.

Hereinafter, the operation principle and embodiments of the present invention will be described with reference to the accompanying drawings.

Figure 2:
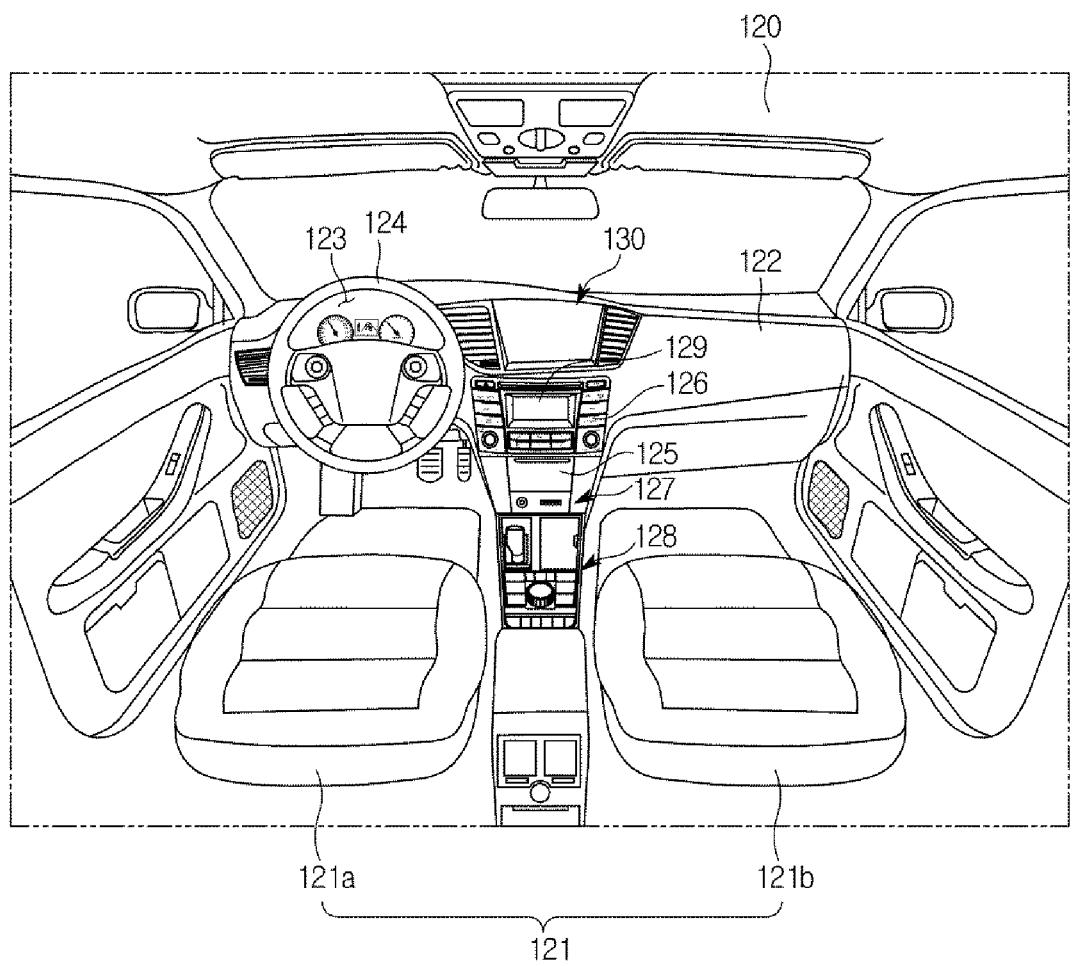
FIG. 2 is a diagram of an example of an internal of the vehicle shown in FIG. 1.

FIG. 1 is a diagram of an example of a vehicle according to an exemplary embodiment of the present invention, and FIG. 2 is a diagram of an example of an internal of the vehicle shown in FIG. 1.

A vehicle 1 is an apparatus which travels by driving wheels to carry persons or cargo and moves on roads. The vehicle 1 may include a body having an internal 120 and an external 110, and a chassis on which mechanical apparatuses necessary for driving are provided and which is a remaining portion excluding the body.

As shown in FIG. 1, the external 110 of the body may include a front panel 111, a bonnet 112, a roof panel 113, a rear panel 114, a trunk 115, front and rear left and right doors 116, and the like.

Furthermore, the external 110 of the body may further include window glasses 117 provided on the front and rear left and right doors 116 and fillers 118 provided at boundaries between the front and rear left and right window glasses 117.

Furthermore, the window glasses 117 provided on the front and rear left and right doors further include side window glasses, quarter window glasses which are provided between the fillers but are not openable or closable, a rear window glass provided on a rear side, and a front window glass provided on a front side thereof.

The external 110 of the body may further include side mirrors 119 and the like for providing a field of view behind the vehicle 1 to the driver.

As shown in FIG. 2, the internal 120 of the body may include seats 121 (121a and 121b) on which occupants sit, a dashboard 122, a steering wheel 124 which operates a direction of the vehicle, a center fascia 125 which extends from the dashboard 122 to a region between the seats 121, and an instrument panel (i.e., a cluster 123) which is disposed on the dashboard and may include a tachometer, a speedometer, a coolant thermometer, a fuel indicator, a turn signal indicator, a high beam indicator light, a warning light, a seat-belt warning light, a trip odometer, an odometer, an automatic transmission selection lever light, a door open warning light, an engine oil warning light, and a low fuel warning light.

The seats 121 may include a driver's seat 121a on which the driver sits, a passenger seat 121b on which a passenger sits, and a rear seat located in the rear of the vehicle. Heat wires for supplying heat may be provided in the seats 121.

The cluster 123 may be implemented in a digital manner. A cluster implemented in a digital manner displays vehicle information and driving information as images.

The center fascia 125 may include a head device 126 of the dashboard 122, which is located between the driver's seat 121a and the passenger seat 121b.

That is, the head device 126 is connected to various electrical loads for performing an audio function, a radio function, an air conditioning function, a heat wire function of a seat, a navigation function, a digital multimedia broadcasting (DMB) function, and a telephone function, receives an operation command input for performing each of the functions, and controls an operation of each of the functions or transmits the operation command to the corresponding load on the basis of the input operation command.

A fan vent, a cigar jack, or the like may be provided in the center fascia 125, and a multi-terminal 127 or the like may be provided.

Here, the multi-terminal 127 may be disposed at a position adjacent to the head device 126. The multi-terminal 127 may include a Universal Serial Bus (USB) port and an auxiliary (AUX) terminal, and may further include a secure digital (SD) slot.

The vehicle 1 may further include an inputter 128 for receiving an operation command input of at least one function of a plurality of functions which may be performed in the vehicle, and may further include a display device 129 for displaying information on a function being performed and information input by a user.

The inputter 128 may be provided in the head device 126, and may include at least one physical button, such as an operation on/off button for various functions, a button for changing setting values of various functions, or the like.

The inputter 128 may be provided in the center fascia 125. In the instant case, the inputter 128 may be provided as a jog dial or a touchpad for inputting a cursor movement command and a selection command which are displayed on a display device of a terminal apparatus 130.

The display device 129 may be a flat display device, such as a liquid-crystal display (LCD), an organic light-emitting diode (OLED), a plasma display panel (PDP), or the like.

The terminal apparatus 130 may be provided in the center fascia 125 to receive an information input from the user and output a result corresponding to the received information. An audio video navigation telematics (AVNT) system, in which electronic devices (an audio device, a video device, a navigation device, and a telematics device) mounted in the vehicle 1 are integrated to provide convenience to an occupant of the vehicle 1, is being constructed on the basis of the terminal apparatus 130.

The terminal apparatus 130 may include an inputter and a display device. When at least one function of a navigation function, a DMB function, an audio function, a video function, a telephone function, and a radio function is selected, the terminal apparatus 130 may perform the at least one selected function and display operation information related to the function being performed.

The inputter of the terminal apparatus 130 may include a touch panel integrally provided on the display device of the terminal apparatus 130.

The inputter of the terminal apparatus 130 may be activated and displayed on the display device of the terminal apparatus 130 in a form of a button, and may receive a position information input of the button displayed at the present time.

The terminal apparatus 130 may include the display, which is configured for displaying information, and the display may include a touch panel which detects a touch input. That is, the inputter and the display device of the terminal apparatus 130 may be provided as a touch screen.

The terminal apparatus 130 may be provided on the dashboard in a stationary manner.

The terminal apparatus 130 may be a user terminal apparatus which communicates with the vehicle.

That is, the user terminal apparatus may be a tablet PC, a mobile phone, a smart phone, a notebook PC, a personal digital assistant (PDA), or the like.

Figure 3:
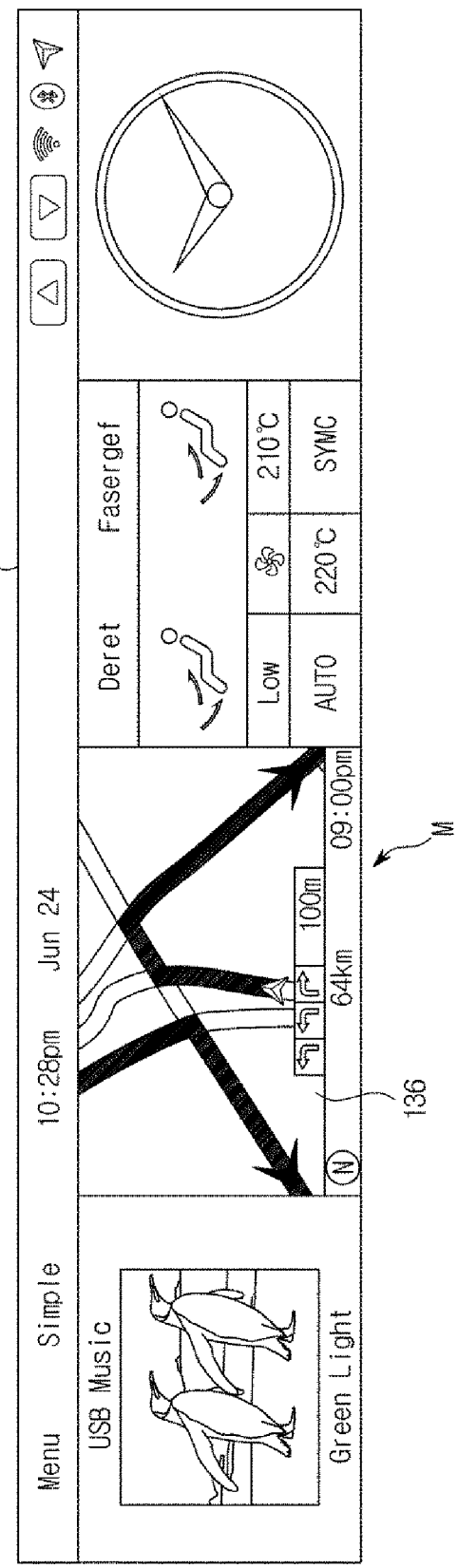
FIG. 3 is a diagram showing operation information displayed on a terminal apparatus according to an exemplary embodiment of the present invention.

FIG. 3 is a diagram showing operation information displayed on the terminal apparatus according to the embodiment.

As shown in FIG. 3, the terminal apparatus 130 according to the exemplary embodiment of the present invention may display various types of information related to operations of the vehicle 1.

A music player screen, an air conditioner control screen, a clock, and the like may be displayed on the display device of the terminal apparatus 130, and a navigation guidance screen M for displaying a driving route of the vehicle 1 may be displayed thereon (300).

A driving route screen of the vehicle 1 shown in FIG. 3 cannot show the entire driving route M to a destination based on a current position of the vehicle 1 because the driving route is displayed on a limited region of the display. Therefore, since the driver of the vehicle 1 may verify only the driving route M currently displayed on the display, it is difficult to verify in advance the route through which the vehicle 1 will travel beyond the currently displayed driving route M or to ascertain the route.

According to the terminal apparatus 130 according to the exemplary embodiment of the present invention, the user may touch the touch panel of the terminal apparatus 130 to enlarge the driving route screen of the vehicle 1 on the basis of an input touch input, and thus the driver may verify the driving route beyond the current driving route if desired.

The chassis of the vehicle may further include a power generator, a power transmission gear, a running gear, a steering system, a brake system, a suspension system, a gearshifting device, a fuel system, front and rear left and right wheels, and the like.

The vehicle 1 may further include various safety devices for the safety of the driver and the occupant. The safety devices of the vehicle include various types of safety devices, such as an airbag control system for safety of occupants such as the driver and the like in the event of a vehicle collision, an electronic stability control (ESC) for correcting the positioning of the vehicle during acceleration or cornering, and the like.

Furthermore, the vehicle 1 may further include sensors, such as a proximity sensor for detecting rear or side obstacles or other vehicles, and a rain sensor for detecting rainfall and precipitation, and the like.

Furthermore, the vehicle 1 may optionally include electronic devices, such as a hands-free device provided for the convenience of the driver, an audio device, a Bluetooth device, a rear camera, a charging device of the terminal apparatus, a Hi-pass device, and the like.

The vehicle 1 may further include a start button for inputting an operation command to a starter motor.

That is, the vehicle 1 operates the starter motor or when the start button is pressed on, and drives an engine, which is a power generator, through an operation of the starter motor.

The vehicle 1 may include an electronic control unit (ECU) for controlling the driving of the power generator, the power transmission gear, the running gear, the steering system, the brake system, the suspension system, the gearshifting device, the fuel system, various types of safety devices, and various types of sensors, and may further include a driver for operating various types of devices on the basis of commands of the ECU.

Figure 4:
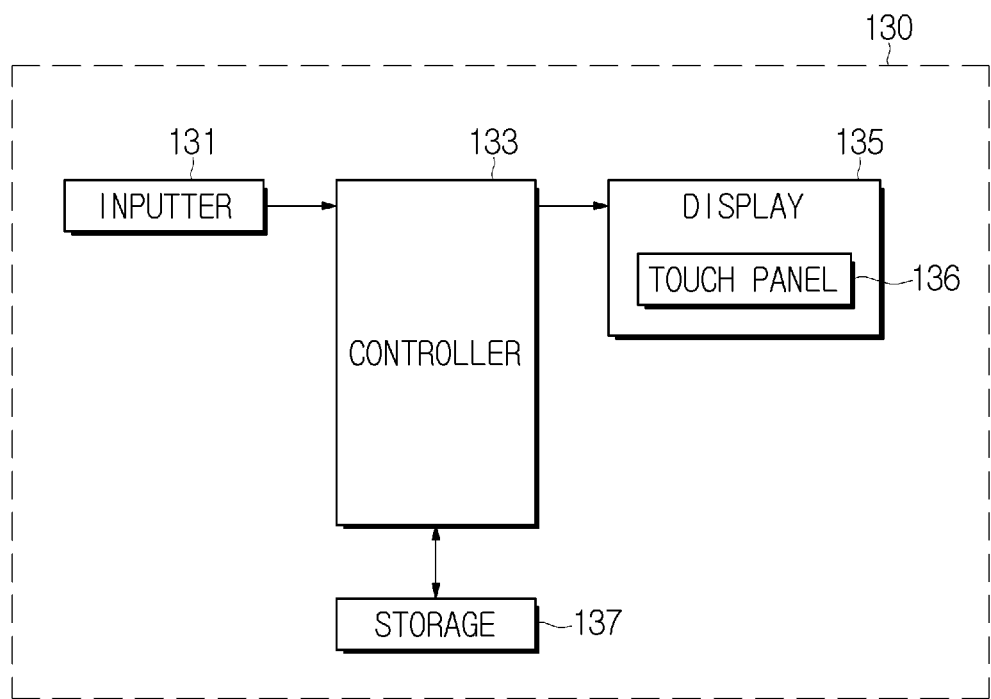
FIG. 4 is a control block diagram of a terminal apparatus according to an exemplary embodiment of the present invention.
Figure 5:
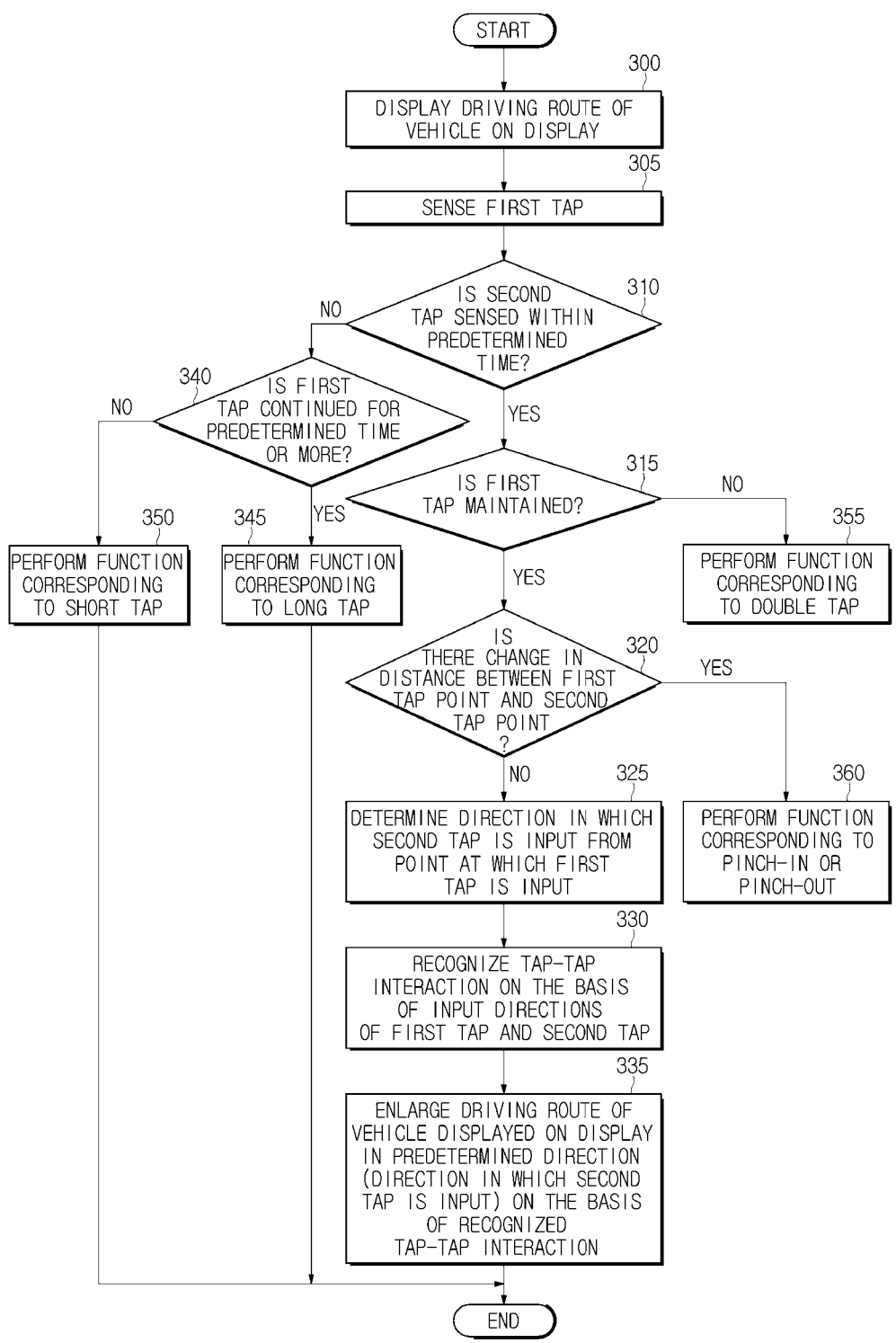
FIG. 5 is a flowchart showing a method of controlling a terminal apparatus according to an exemplary embodiment of the present invention.

FIG. 4 is a control block diagram of a terminal apparatus according to an exemplary embodiment of the present invention, and FIG. 5 is a flowchart showing a method of controlling the terminal apparatus according to the embodiment. FIG. 6, FIG. 7, FIG. 8, FIG. 9, FIG. 10, FIG. 11, FIG. 12, FIG. 13, FIG. 14 and FIG. 15 are diagrams showing touch interactions According to various aspects of the present invention, and driving route screens of a vehicle displayed on a display according to the touch interactions.

A terminal apparatus 130 according to the exemplary embodiment of the present invention may be implemented as an audio video navigation (AVN) system or the like.

Referring to FIG. 4, the terminal apparatus 130 according to the exemplary embodiment of the present invention may include an inputter 131, a controller 133, a display 135, and a storage 137.

The inputter 131 may receive a power on/off command input, receive a selection for at least one function, receive a remote service mode selection, and a delay command selection of the remote service mode. The inputter 131 may receive at least one software update command input.

The display 135 may include a touch panel 136 and detect a touch input which is input by a user.

Here, the touch input is divided into a short tap, a double tap, a long tap, pinch-in, pinch-out, and a tap-tap, and the like as shown in Table 1.

TABLE 1

| Items | Operation |
|---|---|
| Short Tap | One point on a touch panel is touched once within a certain time (e.g., 1 second). |
| Double Tap | One point on a touch panel is touched twice consecutively for a certain time. |
| Long Tap | A touch is maintained at one point on a touch panel for a certain time or more. |
| Pinch-In | While a touch is maintained at one point on a touch panel, another point is touched within a certain time such that the two touch points become further apart from each other. |
| Pinch-Out | While a touch is maintained at one point on a touch panel, another point is touched within a certain time such that the two touch points become closer to each other. |
| Tap-Tap | While a touch is maintained at one point on a touch panel, another point is touched within a certain time. |

The touch panel 136 may be implemented in a form of a touch film, a touch sheet, a touchpad, or the like as a sensor for detecting a touch operation of the user. The touch panel 136 may be implemented in a form of a touch screen (TS) by being coupled to the display 135. In the instant case, the touch screen TS may be used as an output device and an input device.

The touch panel 136 converts a change in pressure or capacitance applied to one point on the touch panel 136 into an electrical signal. The touch panel 136 may be configured to detect a pressure during touching as well as a position (coordinates) and an area of a touch point.

The controller 133 may convert a point at which a touch is input to the touch panel 136 into coordinate data and recognize, on the basis of the converted coordinate data, the touch input which is input to the touch panel 136.

When a first tap (a touch input) is detected through the touch panel 136 (305) and a second tap is then detected, the controller 133 determines whether the second tap is detected within a predetermined time (e.g., 800 ms) after detecting the first tap (310). That is, the controller 133 determines whether the second tap is input to a second point on a surface of the touch panel 136 within a predetermined time after the first tap is input to a first point on the surface of the touch panel 136. Here, the tap refers to a state in which the user touches one point on a screen of the display 135 with a finger or a stylus.

When the second tap is detected within the predetermined time after detecting the first tap, the controller 133 determines whether the second tap is detected while the first tap is maintained (315). In other words, the controller 133 determines whether new touches have occurred at the first point and the second point while the touch is maintained at the first point. In the instant case, the controller 133 determines whether the first point and the second point are different from each other.

When the second tap is detected while the first tap is maintained, the controller 133 determines whether there is a change in distance between the point (a first tap point) at which the first tap is input and the point (a second tap point) at which the second tap is input (320). When it is determined that there is no change in distance, the controller 133 performs operations according to input directions of the first tap and the second tap.

Furthermore, the controller 133 may determine a direction in which the second tap is input from the point at which the first tap is input (325). The controller 133 may determine the input directions on the basis of coordinate data of the point at which the first tap is input and coordinate data of the point at which the second tap is input.

That is, the controller 133 may determine a direction of the point (the second tap point) at which the second tap is input based on the point (the first tap point) at which the first tap is input, and identify a direction-added tap-tap interaction (330).

Tap-tap interactions may be divided into four types of tap-tap interactions according to the input directions of the first tap and the second tap, as shown in FIGS. 6, 8, 12, and 14.

Figure 6:
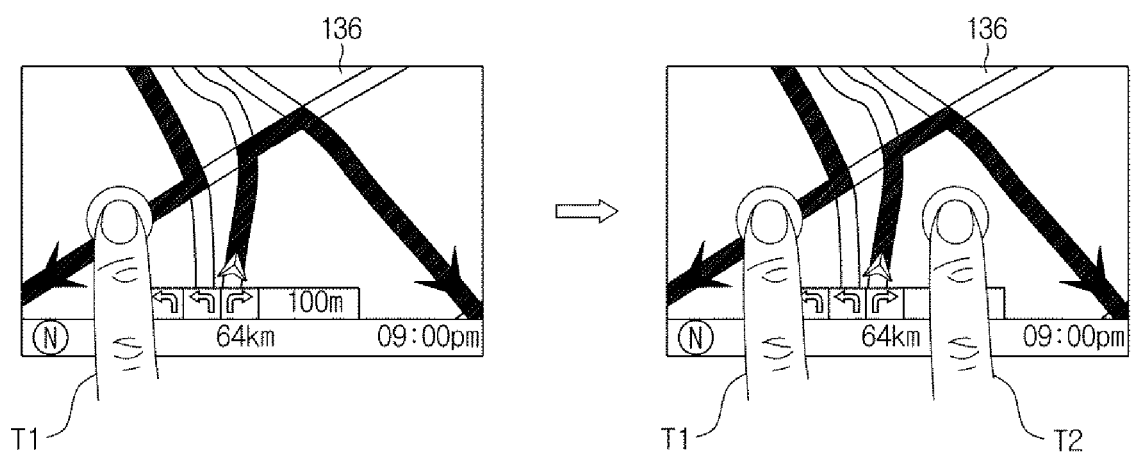
FIG. 6, FIG. 7, FIG. 8, FIG. 9, FIG. 10, FIG. 11, FIG. 12, FIG. 13, FIG. 14 and FIG. 15 are diagrams showing touch interactions according to an exemplary embodiment and driving route screens of a vehicle displayed on a display, which are enlarged according to the touch interactions.

As shown in FIG. 6, a first tap-tap interaction is a left and right (LR) tap-tap in which, while an input of the first tap T1 is maintained, a second tap T2 is input to one point at a right side (a first direction) from a point at which a first tap T1 is input.

Figure 8:
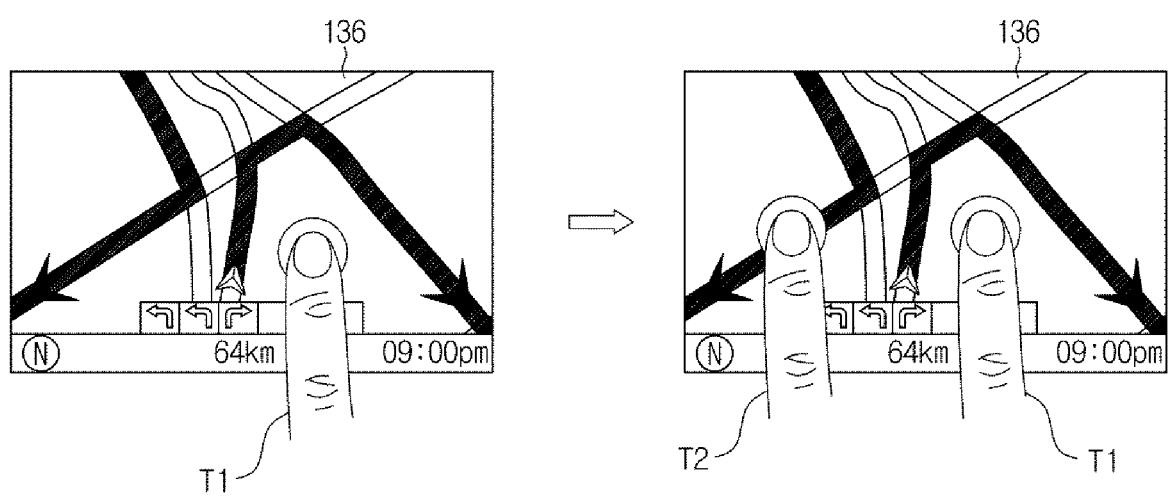

As shown in FIG. 8, a second tap-tap interaction is a right-left (RL) tap-tap in which, while an input of the first tap T1 is maintained, a second tap T2 is input to one point at a left side (a second direction) from a point at which a first tap T1 is input.

Figure 12:
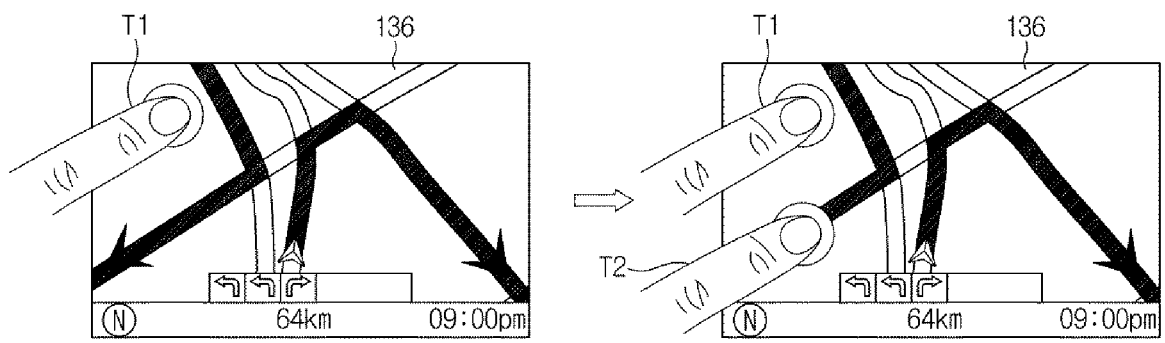

As shown in FIG. 12, a third tap-tap interaction is an up and down (UD) tap-tap in which, while an input of the first tap T1 is maintained, a second tap T2 is input to one point at a lower side (a third direction) from a point at which a first tap T1 is input.

Figure 14:
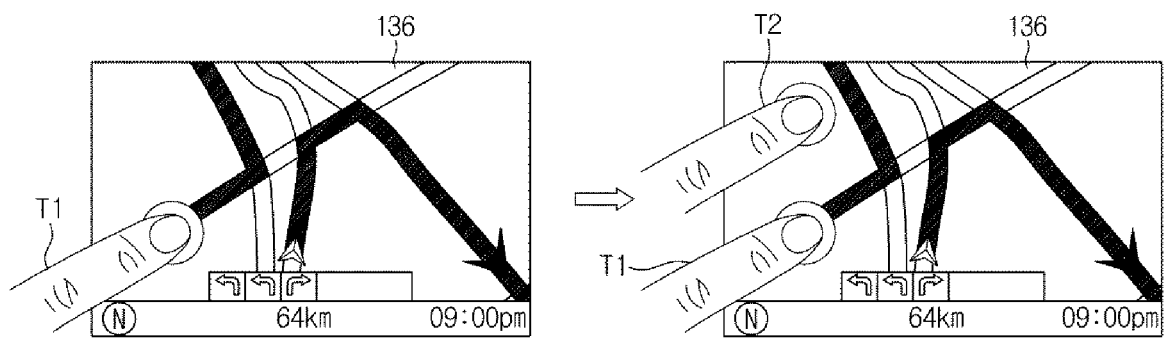

As shown in FIG. 14, a fourth tap-tap interaction is a down-up (DU) tap-tap in which, while an input of the first tap T1 is maintained, a second tap T2 is input to one point at an upper side (a fourth direction) from a point at which a first tap T1 is input.

In the exemplary embodiment of the present invention, the input directions are referred to as being divided into four input directions based on the direction in which a second tap T2 is input with respect to a first tap T1, but the present invention is not limited thereto, and the input directions may be divided into five or more input directions.

The controller 133 may determine the input directions by performing arithmetic processing using the coordinate data of the first tap T1 point and the coordinate data of the second tap T2 point. For example, when coordinate data of the first tap point is (x1, y1) and coordinate data of the second tap point is (x2, y2), the controller 133 determines whether $x2-x1>0$ when $|x2-x1|>|y2-y1|$. The controller 133 determines the tap-tap interaction to be a LR tap-tap when $x2-x1>0$, and determines the tap-tap interaction to be a RL tap-tap when $x2-x1\leq0$.

Meanwhile, the controller 133 determines whether $y2-y1>0$ when $|x2-x1|\leq|y2-y1|$. The controller 133 determines the tap-tap interaction to be a UD tap-tap when $y2-y1>0$, and determines the tap-tap interaction to be a DU tap-tap when $y2-y1\leq0$.

When the second tap is not detected within a predetermined time after detecting the first tap, the controller 133 determines whether the first tap has lasted for a certain time (e.g., 800 ms) or more (340). When it is determined that the first tap has lasted for the certain time or more, the controller 133 performs a function corresponding to (defined as) a long tap (345). When it is determined that the first tap has lasted for less than the certain time, the controller 133 performs a function corresponding to a short tap (350).

When the second tap is detected within a predetermined time while the first tap is not maintained, the controller 133 performs a function corresponding to a double tap (355). In the instant case, a point at which the first tap is input and a point at which the second tap is input are the same or are within a predetermined distance.

When there is a change in distance between the first tap point and the second tap point, the controller 133 performs a function corresponding to pinch-in or pinch-out (360). When the distance between the first tap point and the second tap point is reduced, the controller 133 recognizes that the pinch-out occurs, and when the distance between the first tap point and the second tap point is increased, the controller 133 recognizes that the pinch-in occurs.

Referring to FIGS. 6 to 15, the controller 133 may enlarge the driving route screens of the vehicle 1, which are displayed on the display 135, in a predetermined direction (a direction in which the second tap is input) on the basis of the recognized tap-tap interactions (335).

Figure 7:
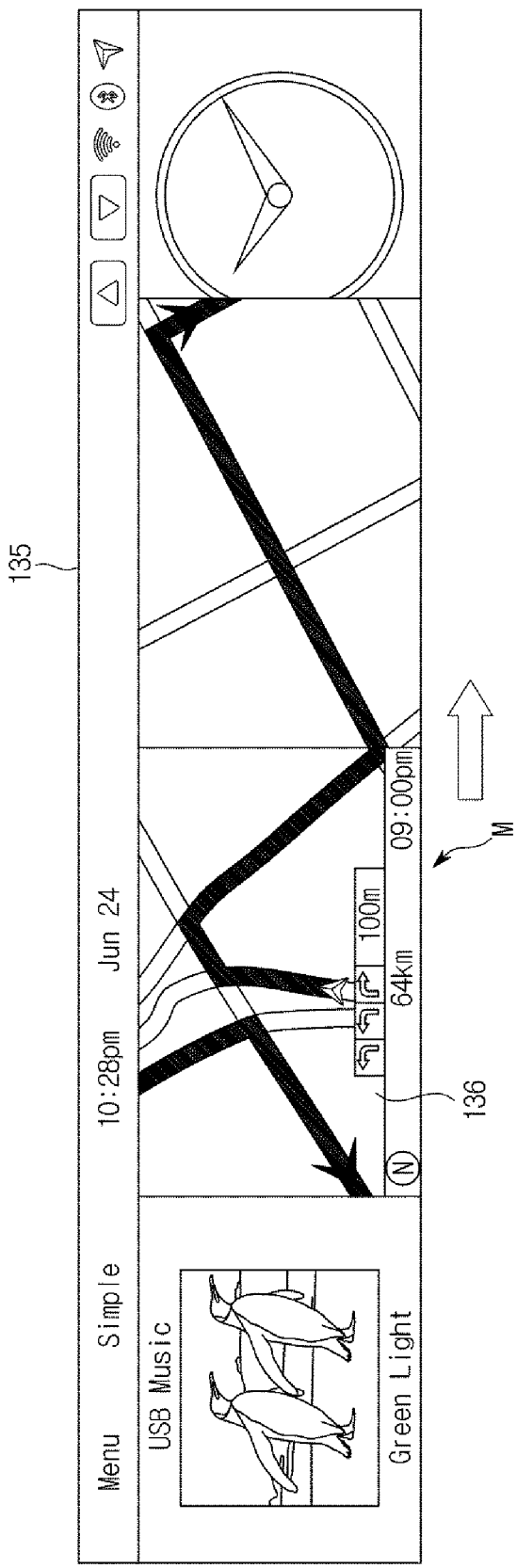

When the controller 133 recognizes the first tap-tap interaction as shown in FIG. 6, the controller 133 may enlarge the driving route M screen of the vehicle 1, which is displayed on the display 135, in the first direction as shown in FIG. 7.

That is, the controller 133 may enlarge the driving route M screen of the vehicle 1 in the first direction to provide to the driver a driving route which is not seen on the driving route M screen of FIG. 3.

The driver may recognize, on the basis of the enlarged driving route M screen, a route through which the vehicle 1 will travel beyond a driving route of a point at which the vehicle 1 is currently located.

Figure 9:
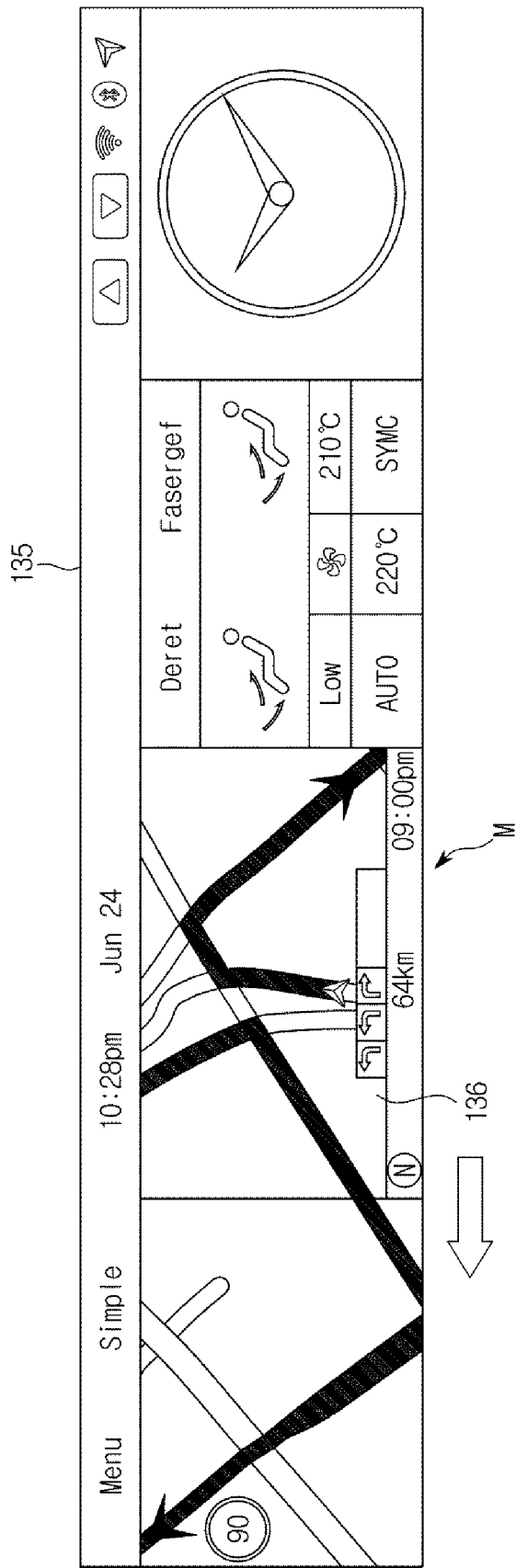

When the controller 133 recognizes the second tap-tap interaction as shown in FIG. 8, the controller 133 may enlarge the driving route M screen of the vehicle 1, which is displayed on the display 135, in the second direction as shown in FIG. 9.

That is, the controller 133 may enlarge the driving route M screen of the vehicle 1 in the second direction to provide to the driver a driving route which is not seen on the driving route M screen of FIG. 3.

The driver may recognize, on the basis of the enlarged driving route M screen, a route through which the vehicle 1 will travel beyond the driving route of the point at which the vehicle 1 is currently located.

Figure 10:
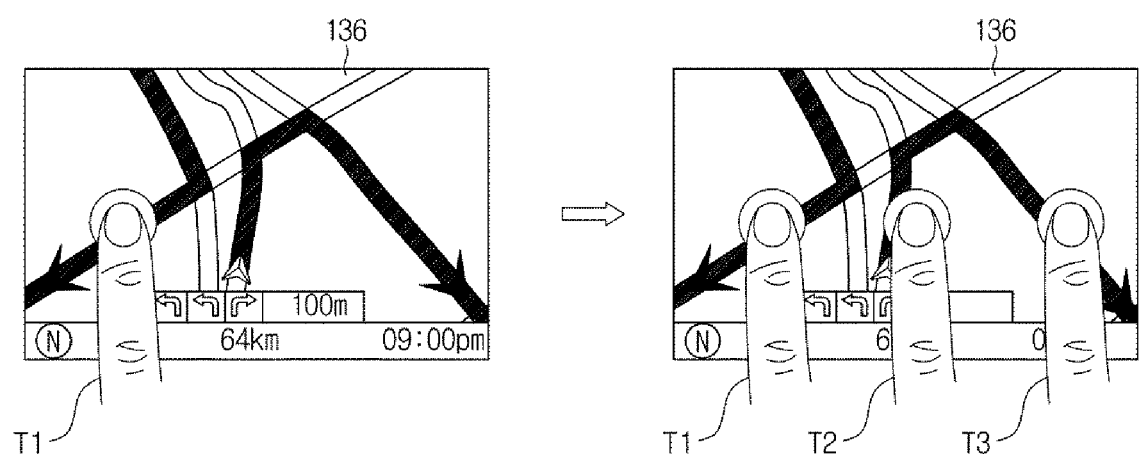

Referring to FIG. 10, during the first tap-tap interaction, a third tap T3 may be further input to one point at the right side (the first direction) from a point at which a second tap T2 is input.

The controller 133 may detect the first tap T1 which is input to the touch panel 136, and then detect at least one second tap T2 which is input within a predetermined time while the first tap T1 is maintained and detect at least one third tap T3 which is input within a predetermined time while the first tap T1 and the at least one second tap T2 are maintained.

When the controller 133 detects the third tap T3, the controller 133 may recognize a tap-tap interaction on the basis of input directions of the first tap T1 and the at least one second tap T2 and input directions of the at least one second tap T2 and the at least one third tap T3, and enlarge the driving route screen of the vehicle, which is displayed on the display 135, in a predetermined direction on the basis of the recognized tap-tap interaction.

Figure 11:
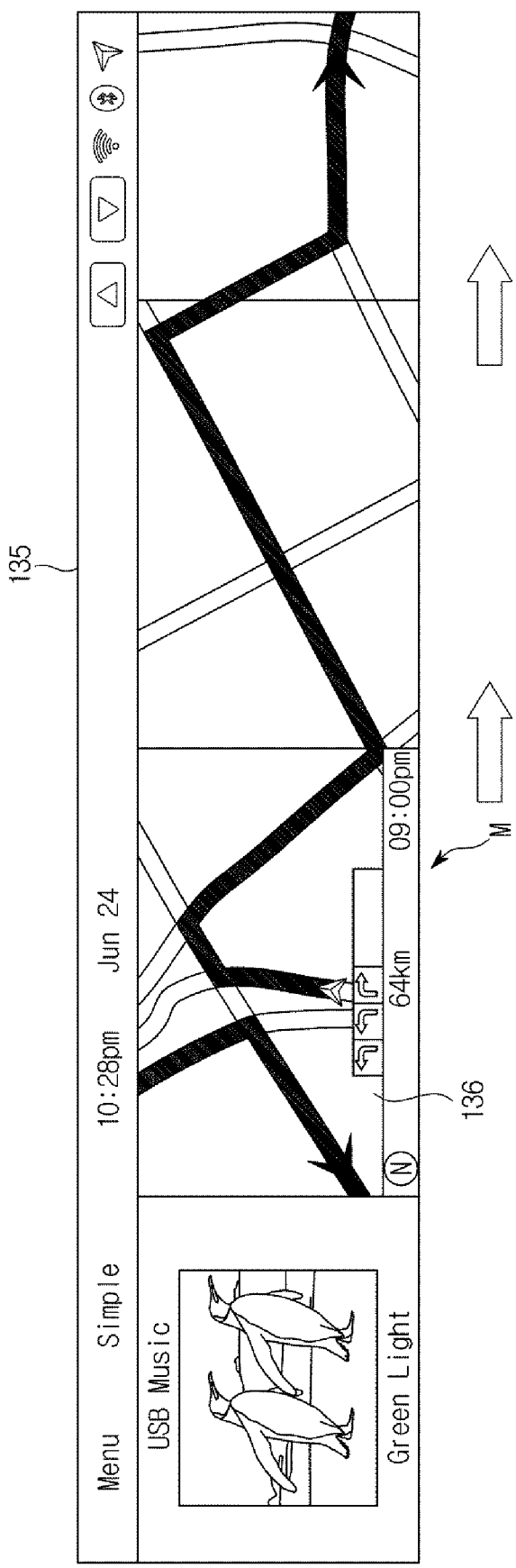

When the controller 133 recognizes the third tap T3 while the second tap T2 is maintained as shown in FIG. 10, the controller 133 may enlarge the driving route M screen of the vehicle 1, which is displayed on the display 135, in the first direction as shown in FIG. 11.

That is, the controller 133 may further enlarge the enlarged driving route M screen of the vehicle 1 in FIG. 6 in the first direction on the basis of the third tap T3 which is further input for the first tap-tap interaction described above in FIG. 6 and FIG. 7.

The driver may recognize, on the basis of the additionally enlarged driving route M screen, a route through which the vehicle 1 will travel beyond the driving route of the point at which the vehicle 1 is currently located.

In FIG. 10, and FIG. 11, the third tap T3 is referred to as being input in the first direction with respect to the second tap T2. However, the third tap T3 may be applied to all of the first to fourth tap-tap interactions described in FIGS. 6, 8, 12, and 14, and the present invention is not limited thereto, and the third tap T3 may be divided into five or more input directions.

Figure 13:
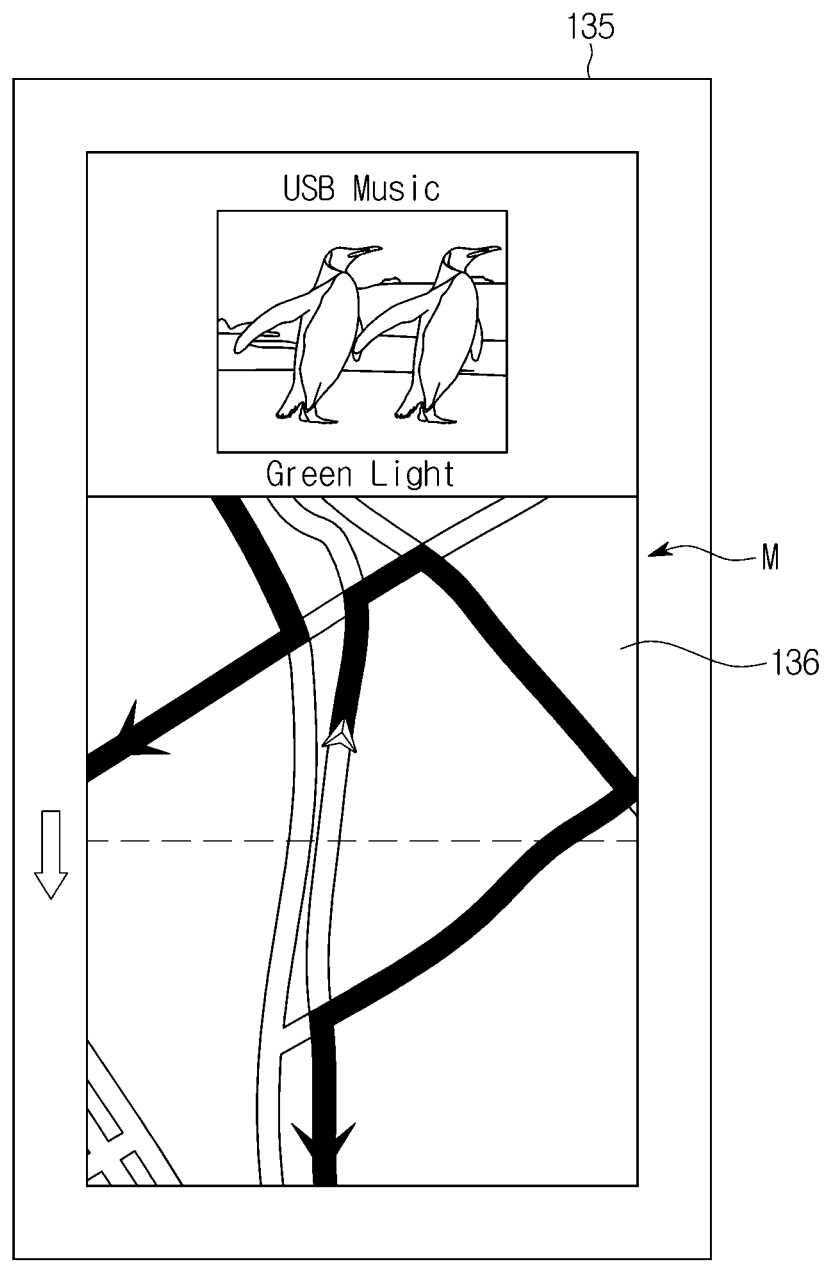

When the controller 133 recognizes the third tap-tap interaction as shown in FIG. 12, the controller 133 may enlarge the driving route M screen of the vehicle 1, which is displayed on the display 135, in the third direction as shown in FIG. 13.

That is, the controller 133 may enlarge the driving route M screen of the vehicle 1 in the third direction to provide to the driver a driving route which is not seen on the driving route M screen of FIG. 3.

The driver may recognize, on the basis of the enlarged driving route M screen, a route through which the vehicle 1 will travel beyond the driving route of the point at which the vehicle 1 is currently located.

Figure 15:
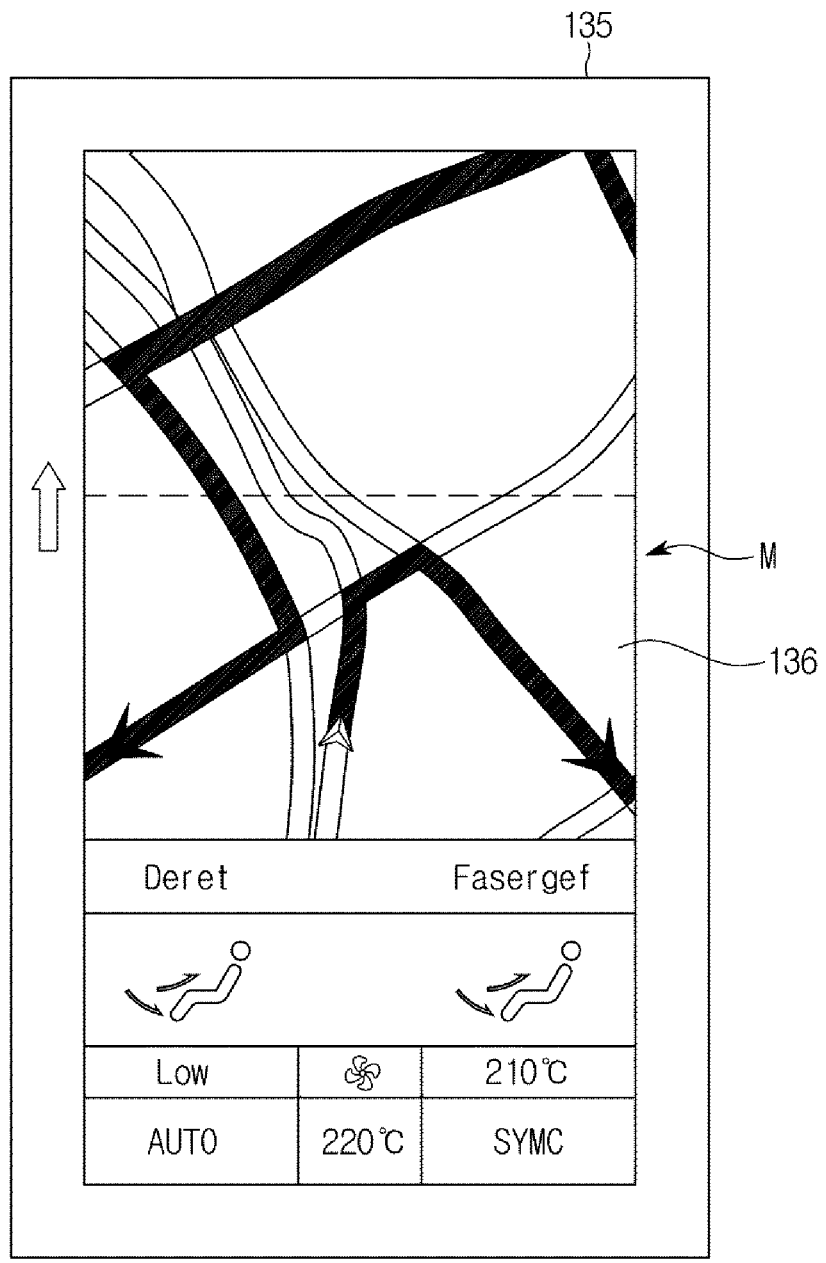

When the controller 133 recognizes the fourth tap-tap interaction as shown in FIG. 14, the controller 133 may enlarge the driving route M screen of the vehicle 1, which is displayed on the display 135, in the fourth direction as shown in FIG. 15.

That is, the controller 133 may enlarge the driving route M screen of the vehicle 1 in the fourth direction to provide to the driver a driving route which is not seen on the driving route M screen of FIG. 3.

The driver may recognize, on the basis of the enlarged driving route M screen, a route through which the vehicle 1 will travel beyond the driving route of the point at which the vehicle 1 is currently located.

Furthermore, although not shown in the drawings, the controller 133, when the tap-tap interaction is recognized, may enlarge the driving route screen of the vehicle 1 in the predetermined direction while maintaining a scale of the driving route, which is displayed on the display 135, and display a driving route of the vehicle 1 which is not visible before the enlargement of the screen.

That is, the controller 13 may enlarge only the driving route screen in the predetermined direction while maintaining the scale and size of a current map, in which the vehicle 1 is located, without changing the scale of the driving route map screen, which is displayed on the display 135 before the tap-tap interaction is input, Under the control of the controller 13, the driving route screen of the vehicle 1, which is displayed on the display 135, may be enlarged in the predetermined direction thereof, and a driving route of the vehicle 1 which is not visible before the enlargement of the screen may be displayed while the scale of the scale of the driving route screen is maintained.

Furthermore, the controller 133, when the tap-tap interaction is recognized, may enlarge the driving route screen of the vehicle 1 in the predetermined direction while maintaining the current position of the vehicle 1, which is displayed on the display 135, and display a driving route of the vehicle 1 which is not visible before the enlargement of the screen.

That is, the controller 13 may enlarge only the driving route screen in the predetermined direction without changing the current position of the vehicle 1, which is displayed on the display 135 before the tap-tap interaction is input, Under the control of the controller 13, the driving route screen of the vehicle 1, which is displayed on the display 135, may be enlarged in the predetermined direction thereof, and a driving route of the vehicle 1 which is not visible before the enlargement of the screen may be displayed while the current position of the vehicle 1 is maintained.

Although not shown in the drawings, the controller 133 may determine whether a driving route of the vehicle 1 exists on the driving route screen which is to be enlarged on the display 135 in an input direction determined on the basis of the input tap-tap interaction.

That is, when a driving route through which the vehicle 1 is configured to travel does not exist in the input direction determined on the basis of the tap-tap interaction, there is no need to enlarge the driving route screen in the determined screen. Accordingly, the controller 133 may control the driving route screen of the vehicle 1, which is displayed on the display 135, not to be enlarged in the determined input direction thereof.

Meanwhile, although not shown in the drawings, the controller 133 may enlarge the driving route screen of the vehicle 1, which is displayed on the display 135, in a predetermined direction without recognizing the tap-tap interaction on the basis of the touch input which is input to the touch panel 136.

That is, the controller 133 may obtain various types of traffic information and road information (traffic accidents, traffic congestion, road construction, driving routes variables, driving routes to predetermined destinations, etc.) on the driving route while driving the vehicle 1. The controller 133 may enlarge the driving route screen of the vehicle 1 in a predetermined direction on the basis of the obtained traffic information and road information to provide the obtained traffic information and road information to the driver.

That is, the controller 133 may obtain at least one piece of traffic information and road information on the driving route of the vehicle 1, and when the obtained at least one piece of traffic information and road information corresponds to a predetermined driving route screen enlargement condition, may enlarge the driving route screen of the vehicle 1 in the predetermined direction thereof, and display a driving route of the vehicle which is not visible on the display 135 before the enlargement of the screen 1.

Furthermore, the controller 133 may control the display 135 to display an interface related to the enlargement of the driving route screen when the at least one piece of traffic information and road information obtained on the driving route of the vehicle 1 corresponds to the predetermined driving route screen enlargement condition. The interface may include an arrow indicating a direction in which the driving route screen is enlarged and an icon allowing the tap-tap interface to be input such that the driving route screen is enlarged.

That is, in a response to recognizing a need to enlarge the driving route screen on the driving route of the vehicle 1, the controller 133 may display the interface related to the enlargement of the driving route screen on the display 135 to actively provide information related to the enlargement of the driving route screen, The driver may recognize the interface displayed on the display 135, and input a tap-tap interaction for the enlargement of the driving route screen.

Figure 16:
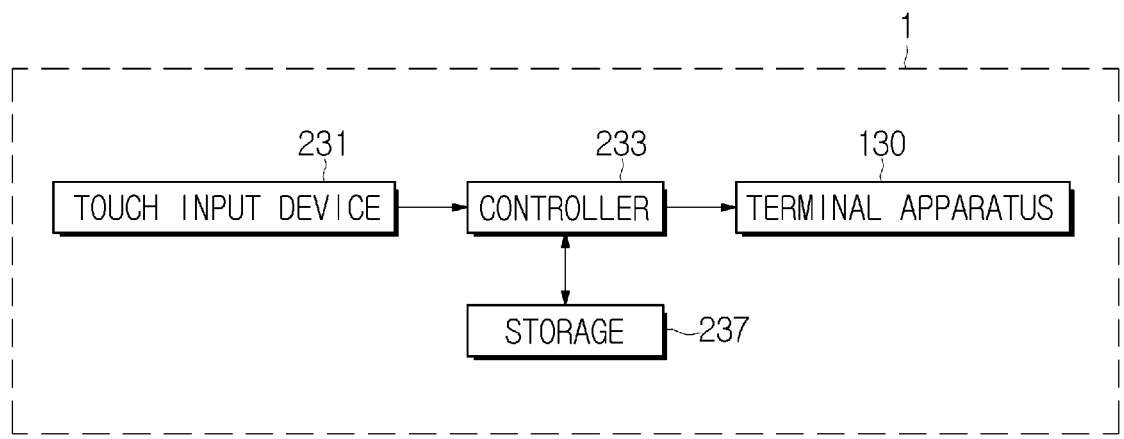
FIG. 16 is a control block diagram of a vehicle according to an exemplary embodiment of the present invention.

FIG. 16 is a control block diagram of a vehicle according to an exemplary embodiment of the present invention.

A vehicle 1 according to the exemplary embodiment of the present invention may include a terminal apparatus 130 configured to display a driving route of the vehicle 1, a touch input device 231 configured to detect a touch input, a controller 233 configured to enlarge a driving route screen, which is displayed on the terminal apparatus 130, in a predetermined direction on the basis of the touch input which is input through the touch input device 231, and a storage 237 configured to store information related to operations of the vehicle 1.

The touch input device 231 may be provided on a dashboard 30 or may be provided in a form of a central control panel (CCP) to detect a touch input which is input by a driver.

The touch input device 231 may be variously implemented with a touch-capable technical concept. For example, the touch input device 231 may be provided in a plane shape configured for detecting a touch. Alternatively, the touch input device 231 may be provided in a circular shape or an elliptical shape.

A touch device provided in the touch input device 231 may be a touchpad in which a signal is generated when the driver is in contact with or approaches the touchpad through his or her finger or a point such as a touch pen or the like. The occupant may enter a predetermined touch gesture to input a desired control command into the touch device.

The touchpad may include a touch film, a touch sheet, or the like including a touch sensor, despite its name. Furthermore, the touchpad may include a touch panel, which is a display device of which a screen is touchable.

Meanwhile, a position of a pointer being recognized while the pointer is close to a touchpad without being in contact with the touchpad is referred to as a "proximity touch," and a position of a pointer being recognized when the pointer is in contact with the touchpad is referred to as a "contact touch." In the instant case, a position recognized in the proximity touch may be a position at which the pointer vertically corresponds to the touchpad when the pointer is close to the touchpad.

The touchpad may be provided using a resistive film method, an optical method, a capacitive method, an ultrasonic method, a pressure method, or the like. That is, the touchpads provided using various known methods may be used.

In FIGS. 3 to 15, when the user touches the display 135 provided on the terminal apparatus 130 and a touch is input, the controller 133 enlarges the driving route screen of the vehicle 1, which is displayed on the display 135, on the basis of the touch input which is input to the display 135. In FIG. 16, when the user inputs a touch through the touch input device 231, the controller 233 may enlarge the driving route screen of the vehicle 1, which is displayed on the terminal apparatus 130, on the basis of the touch input which is input to the touch input device 231.

That is, the controller 233 may detect a first tap input to the touch input device 231 and then detect at least one second tap within a predetermined time while the first tap is maintained. The controller 233 may recognize a tap-tap interaction on the basis of input directions of the first tap and the at least one second tap, and enlarge the driving route screen of the vehicle 1, which is displayed on the terminal apparatus 130, in a predetermined direction on the basis of the recognized tap-tap interaction.

The technical concept of the present invention based on the control block diagram of the vehicle 1 according to the exemplary embodiment shown in FIG. 16 may be implemented in the same manner as the terminal apparatus 130 and the method of controlling the same described in FIGS. 3 to 15, and thus the description thereof will not be repeated.

A touch interaction input by a driver is detected and a driving route screen displayed on a screen is enlarged, and thus it is possible to provide a driving route which cannot be verified before the enlargement of the screen based on a current position of a vehicle.

Meanwhile, the disclosed exemplary embodiments may be implemented in the form of a recording medium configured to store instructions executable by a computer. The instructions may be stored in the form of program code. When the instructions are executed by a processor, the operations of the disclosed exemplary embodiments may be performed by a program module being generated thereby. The recording medium may be implemented as a computer-readable recording medium.

The computer-readable recoding medium may include all types of recording media in which instructions which may be decoded by a computer, are stored. For example, examples of the computer-readable recording medium may include a read only memory (ROM), a random access memory (RAM), a magnetic tape, a magnetic disk, a flash memory, an optical data storage device, and the like.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A terminal apparatus comprising:
   a display configured to display a driving route of a vehicle;
   a touch panel provided on the display and configured to detect a touch input; and
   a controller configured to, when a first tap input to the touch panel is detected and then at least one second tap input within a predetermined time is detected while the first tap is maintained, recognize a tap-tap interaction on a basis of input directions of the first tap and the at least one second tap, enlarge a driving route screen of the vehicle, which is displayed on the display, in a predetermined direction thereof on a basis of the recognized tap-tap interaction, and display a driving route of the vehicle which is not visible before the enlargement of the driving route screen,
   wherein the controller, when the tap-tap interaction is recognized, enlarges the driving route screen of the vehicle in the predetermined direction thereof while maintaining a scale of the driving route, which is displayed on the display, and displays the driving route of the vehicle which is not visible before the enlargement of the driving route screen.

2. The terminal apparatus according to claim 1, wherein the controller is configured to convert a point at which a touch is input to the touch panel into coordinate data and recognizes the tap-tap interaction on a basis of the converted coordinate data.

3. The terminal apparatus according to claim 2, wherein the controller is configured to determine the input directions on a basis of coordinate data of a point at which the first tap is input and coordinate data of a point at which the at least one second tap is input.

4. The terminal apparatus according to claim 1, wherein, when an input of the at least one second tap is, while an input of the first tap is maintained, detected at a point in a first direction from the point at which the first tap is input, the controller is configured to recognize the tap-tap interaction as a first tap-tap interaction.

5. The terminal apparatus according to claim 4, wherein, when the controller is configured to recognize the first tap-tap interaction, the controller enlarges the driving route screen of the vehicle, which is displayed on the display, in the first direction thereof.

6. The terminal apparatus according to claim 1, wherein, when an input of the at least one second tap is, while an input of the first tap is maintained, detected at a point in a second direction from the point at which the first tap is input, the controller is configured to recognize the tap-tap interaction as a second tap-tap interaction.

7. The terminal apparatus according to claim 6, wherein, when the controller is configured to recognize the second tap-tap interaction, the controller enlarges the driving route screen of the vehicle, which is displayed on the display, in the second direction thereof.

8. The terminal apparatus according to claim 1, wherein, when an input of the at least one second tap is, while an input of the first tap is maintained, detected at a point in a third direction from the point at which the first tap is input, the controller is configured to recognize the tap-tap interaction as a third tap-tap interaction.

9. The terminal apparatus according to claim 8, wherein, when the controller is configured to recognize the third tap-tap interaction, the controller enlarges the driving route screen of the vehicle, which is displayed on the display, in the third direction thereof.

10. The terminal apparatus according to claim 1, wherein, when an input of the at least one second tap is, while an input of the first tap is maintained, detected at a point in a fourth direction from the point at which the first tap is input, the controller is configured to recognize the tap-tap interaction as a fourth tap-tap interaction.

11. The terminal apparatus according to claim 10, wherein, when the controller is configured to recognize the fourth tap-tap interaction, the controller enlarges the driving route screen of the vehicle, which is displayed on the display, in the fourth direction thereof.

12. The terminal apparatus according to claim 1, wherein when the at least one second tap is not detected within the predetermined time after detecting the first tap and the first tap is determined by the controller to have lasted for a predetermined time period, the controller is configured to perform a long tap.

13. The terminal apparatus according to claim 1, wherein when the at least one second tap is not detected within the predetermined time after detecting the first tap and the first tap is determined by the controller to have lasted for less than a predetermined time period, the controller is configured to perform a short tap.

14. A terminal apparatus comprising:
a display configured to display a driving route of a vehicle;
a touch panel provided on the display and configured to detect a touch input; and
a controller configured to, when a first tap input to the touch panel is detected and then at least one second tap within a predetermined time is detected while the first tap is maintained, recognize a tap-tap interaction on a basis of input directions of the first tap and the at least one second tap, enlarge a driving route screen of the vehicle, which is displayed on the display, in a predetermined direction thereof on a basis of the recognized tap-tap interaction, and display a driving route of the vehicle which is not visible before the enlargement of the driving route screen,
wherein the controller, when the tap-tap interaction is recognized, enlarges the driving route screen of the vehicle in the predetermined direction thereof while maintaining a current position of the vehicle, which is displayed on the display, and displays the driving route of the vehicle which is not visible before the enlargement of the driving route screen.

15. A terminal apparatus comprising: a display configured to display a driving route of a vehicle; a touch panel provided on the display and configured to detect a touch input; and a controller configured to, when a first tap input to the touch panel is detected and then at least one second tap input within a predetermined time is detected while the first tap is maintained, recognize a tap-tap interaction on a basis of input directions of the first tap and the at least one second tap, enlarge a driving route screen of the vehicle, which is displayed on the display, in a predetermined direction thereof on a basis of the recognized tap-tap interaction, and display a driving route of the vehicle which is not visible before the enlargement of the driving route screen, wherein the controller is configured to determine the input directions on a basis of coordinate data of a point at which the first tap is input and coordinate data of a point at which the at least one second tap is input, and wherein the controller is configured to: determine whether the driving route of the vehicle exists on the driving route screen which is to be enlarged in the determined input directions thereof, and exclude enlarging the driving route screen of the vehicle in the determined input directions when the driving route of the vehicle does not exist on the driving route screen to be enlarged in the determined input directions thereof.

16. A terminal apparatus comprising:
a display configured to display a driving route of a vehicle;
a touch panel provided on the display and configured to detect a touch input; and
a controller configured to, when a first tap input to the touch panel is detected and then at least one second tap input within a predetermined time is detected while the first tap is maintained, recognize a tap-tap interaction on a basis of input directions of the first tap and the at least one second tap, enlarge a driving route screen of the vehicle, which is displayed on the display, in a predetermined direction thereof on a basis of the recognized tap-tap interaction, and display a driving route of the vehicle which is not visible before the enlargement of the driving route screen,
wherein the controller is configured to:
obtain at least one piece of traffic information and road information on the driving route of the vehicle; and
when the obtained at least one piece of the traffic information and the road information corresponds to a predetermined driving route screen enlargement condition, enlarge the driving route screen of the vehicle in the predetermined direction thereof, and display the driving route of the vehicle which is not visible before the enlargement of the driving route screen.

17. The terminal apparatus according to claim 16, wherein the controller is configured to:
display an interface related to the enlargement of the driving route screen on the display when the obtained at least one piece of the traffic information and the road information corresponds to the predetermined driving route screen enlargement condition,
wherein the interface includes an arrow indicating a direction in which the driving route screen is enlarged and an icon allowing a tap-tap interface to be input such that the driving route screen is enlarged.

18. A method of controlling a terminal apparatus, the method comprising:
displaying a driving route of a vehicle on a display;
detecting, by a controller, a first tap input to a touch panel;
detecting, by the controller, at least one second tap input within a predetermined time while the first tap is maintained;
recognizing, by the controller, a tap-tap interaction on a basis of input directions of the first tap and the at least one second tap; and
enlarging, by the controller, a driving route screen of the vehicle, which is displayed on the display, in a predetermined direction thereof on a basis of the recognized tap-tap interaction and displaying a driving route of the vehicle which is not visible before the enlarging of the driving route screen,
wherein the enlarging of the driving route screen of the vehicle includes:
enlarging the driving route screen of the vehicle in the predetermined direction thereof while maintaining a scale of the driving route, which is displayed on the display, when the tap-tap interaction is recognized; and
displaying the driving route of the vehicle which is not visible before the enlargement of the driving route screen.

19. The method according to claim 18, wherein the recognizing of the tap-tap interaction includes converting a point at which a touch is input to the touch panel into coordinate data and recognizing the tap-tap interaction on a basis of the converted coordinate data.

20. The method according to claim 19, wherein the determining of the input direction of the at least one second tap includes determining the input directions on a basis of coordinate data of a point at which the first tap is input and coordinate data of a point at which the at least one second tap is input.

21. A method of controlling a terminal apparatus, the method comprising:
displaying a driving route of a vehicle on a display;
detecting, by a controller, a first tap input to a touch panel;
detecting, by the controller, at least one second tap input within a predetermined time while the first tap is maintained;
recognizing, by the controller, a driving route screen of the vehicle, which is displayed on the display, in a predetermined direction thereof on a basis of the recognized tap-tap interaction and displaying a driving route of the vehicle which is not visible before the enlarging of the driving route screen,
wherein the enlarging of the driving route screen of the vehicle includes:
enlarging the driving route screen of the vehicle in the predetermined direction thereof while maintaining a current position of the vehicle, which is displayed on the display; and
displaying the driving route of the vehicle which is not visible before the enlargement of the driving route screen.

22. A method of controlling a terminal apparatus, the method comprising: displaying a driving route of a vehicle on a display; detecting, by a controller, a first tap input to a touch panel; detecting, by the controller, at least one second tap input within a predetermined time while the first tap is maintained; recognizing, by the controller, a tap-tap interaction on a basis of an input direction of the first tap and an input direction of the at least one second tap; and enlarging, by the controller, a driving route screen of the vehicle, which is displayed on the display, in a predetermined direction thereof on a basis of the recognized tap-tap interaction, and displaying a driving route of the vehicle which is not visible before the enlarging of the driving route screen; wherein the determining of the input direction of the at least one second tap includes determining the input direction of the at least one second tap on a basis of coordinate data of a point at which the first tap is input and coordinate data of a point at which the at least one second tap is input, determining whether the driving route of the vehicle exists on the driving route screen which is to be enlarged in the predetermined input direction; and excluding enlarging the driving route screen of the vehicle in the predetermined input direction when the driving route of the vehicle does not exist on the driving route screen to be enlarged in the predetermined input direction.

23. A method of controlling a terminal apparatus, the method comprising:
displaying a driving route of a vehicle on a display;
detecting, by a controller, a first tap input to a touch panel;
detecting, by the controller, at least one second tap input within a predetermined time while the first tap is maintained;
recognizing, by the controller, a tap-tap interaction on a basis of input directions of the first tap and the at least one second tap;
enlarging, by the controller, a driving route screen of the vehicle, which is displayed on the display, in a predetermined direction thereof on a basis of the recognized tap-tap interaction and displaying a driving route of the vehicle which is not visible before the enlarging of the driving route screen;
obtaining at least one piece of traffic information and road information on the driving route of the vehicle; and
when the obtained at least one piece of the traffic information and the road information corresponds to a predetermined driving route screen enlargement condition, enlarging the driving route screen of the vehicle in the predetermined direction thereof, and displaying the driving route of the vehicle which is not visible before the enlargement of the driving route screen.

24. The method according to claim 23, further including:
displaying an interface related to the enlargement of the driving route screen on the display when the obtained at least one piece of the traffic information and the road information corresponds to the predetermined driving route screen enlargement condition,
wherein the interface includes an arrow indicating a direction in which the driving route screen is enlarged and an icon allowing the tap-tap interface to be input such that the driving route screen is enlarged.

25. A vehicle comprising:
a terminal apparatus configured to display a driving route of a vehicle;
a touch input device configured to detect a touch input; and
a controller configured to, when a first tap input to the touch input device is detected and then at least one second tap input within a predetermined time is detected while the first tap is maintained, recognize a tap-tap interaction on a basis of input directions of the first tap and the at least one second tap, enlarge a driving route screen of the vehicle, which is displayed on the terminal apparatus, in a predetermined direction thereof on a basis of the recognized tap-tap interaction, and display a driving route of the vehicle which is not visible before the enlargement of the driving route screen,
wherein the terminal apparatus, when the tap-tap interaction is recognized, enlarges the driving route screen of the vehicle in the predetermined direction thereof while maintaining a scale of the driving route, which is displayed on a display, and displays the driving route of the vehicle which is not visible before the enlargement of the driving route screen.

26. A terminal apparatus comprising:
a display configured to display a driving route of a vehicle;
a touch panel provided on the display and configured to detect a touch input; and
a controller configured to, when a first tap input to the touch input device is detected and then at least one second tap input within a predetermined time is detected while the first tap is maintained and at least one third tap input within a predetermined time is detected while the first tap and the at least one second tap are maintained, recognize a tap-tap interaction on a basis of input directions of the first tap and at the least one second tap and input directions of the at least one second tap and at least one third tap, enlarge a driving route screen of the vehicle, which is displayed on the display, in a predetermined direction thereof on a basis of the recognized tap-tap interaction, and display a driving route of the vehicle which is not visible before the enlargement of the driving route screen,
wherein the controller, when the tap-tap interaction is recognized, enlarges the driving route screen of the vehicle in the predetermined direction thereof while maintaining a scale of the driving route, which is displayed on the display, and displays the driving route of the vehicle which is not visible before the enlargement of the driving route screen.

* * * * *